United States Patent
Woods et al.

(10) Patent No.: US 9,115,675 B2
(45) Date of Patent: Aug. 25, 2015

(54) METHOD AND SYSTEM FOR CLEANING A CHARCOAL CANISTER OF AN EMISSIONS SYSTEM USING A FUEL CELL

(71) Applicant: Continental Automotive Systems, Inc., Auburn Hills, MI (US)

(72) Inventors: Brian Gordon Woods, Chatham (CA); David William Balsdon, Chatham (CA)

(73) Assignee: Continental Automotive Systems, Inc., Auburn Hills, MI (US)

( * ) Notice: Subject to any disclaimer, the term of this patent is extended or adjusted under 35 U.S.C. 154(b) by 394 days.

(21) Appl. No.: 13/691,871

(22) Filed: Dec. 3, 2012

(65) Prior Publication Data
US 2014/0150752 A1 Jun. 5, 2014

(51) Int. Cl.
| | |
|---|---|
| F02M 33/02 | (2006.01) |
| F02M 25/08 | (2006.01) |
| H01M 16/00 | (2006.01) |
| H01M 8/04 | (2006.01) |
| H01M 8/12 | (2006.01) |

(52) U.S. Cl.
CPC .............. *F02M 33/02* (2013.01); *F02M 25/089* (2013.01); *H01M 8/04089* (2013.01); *H01M 16/00* (2013.01); *H01M 2008/1293* (2013.01); *H01M 2250/20* (2013.01); *Y02E 60/525* (2013.01); *Y02T 90/32* (2013.01)

(58) Field of Classification Search
CPC ........... F02M 25/089; H01M 8/04089; H01M 16/066; H01M 2008/1293; H01M 2250/20; Y02T 10/6213; Y02T 10/7083; Y02T 90/34
See application file for complete search history.

(56) References Cited

U.S. PATENT DOCUMENTS

| | | | |
|---|---|---|---|
| 5,248,566 A | 9/1993 | Kumar et al. | |
| 7,353,897 B2* | 4/2008 | Fernandez | 180/65.8 |
| 7,448,367 B1* | 11/2008 | Reddy et al. | 123/520 |
| 8,495,863 B2* | 7/2013 | Zelβmann et al. | 60/283 |
| 2002/0124836 A1* | 9/2002 | Reddy | 123/518 |
| 2009/0084363 A1* | 4/2009 | Reddy | 123/520 |
| 2012/0138022 A1* | 6/2012 | Ryu et al. | 123/520 |
| 2013/0152905 A1* | 6/2013 | Woods et al. | 123/520 |

FOREIGN PATENT DOCUMENTS

DE 102008030196 A1 12/2009

OTHER PUBLICATIONS

PCT Search Report & Written Opinion in PCT/US2012/067510 dated Aug. 2, 2013.

* cited by examiner

*Primary Examiner* — Thomas Moulis
*Assistant Examiner* — Elizabeth Hadley

(57) ABSTRACT

An evaporative emission control system for a vehicle includes a fuel tank, a vapor collection canister in communication with the fuel tank so as to receive hydrocarbons, a fuel cell in communication with the canister, and a pump constructed and arranged to pump hydrocarbons from the canister to the fuel cell so that the fuel cell can purge the canister by converting the hydrocarbons to water, carbon dioxide and electricity.

9 Claims, 2 Drawing Sheets

METHOD AND SYSTEM FOR CLEANING A CHARCOAL CANISTER OF AN EMISSIONS SYSTEM USING A FUEL CELL

FIELD

This invention relates to vapor management systems of vehicles and, more particularly, to a system and method for cleaning a charcoal canister with a fuel cell.

BACKGROUND

FIG. 1 shows a conventional evaporative emission control system (EVAP), generally indicated at 10, of a motor vehicle including a fuel vapor collection canister (e.g., a carbon canister) 12 and a normally closed canister purge valve 14 connected between a fuel tank 16 and an intake manifold 18 of an internal combustion engine 20 in a known fashion. A normally open canister vent valve 22 is in fluid communication between a vapor collection canister 12 and ambient atmospheric conditions via a filter 24. Under certain conditions, the purge valve 14 is opened and hydrocarbon vapors are drawn into the intake manifold 18 to be consumed by the engine 20.

With plug-in hybrid vehicles, vehicle operation may be such that the gas engine 20 may never need to be operated to charge the battery system. The vehicle fuel economy improves when the battery system is charged directly in the plug-in mode. However, if the gas engine is not operated, no vacuum is created at the intake manifold 18 for purging of the canister 12. Even without gas engine operation, the canister 12 will absorb hydrocarbons, after refueling or in hot weather, which will need to be purged.

Thus, there is a need for an evaporative emission control system to clean the canister at times when a gas engine of the vehicle is not operating.

SUMMARY

An object of the invention is to fulfill the need referred to above. In accordance with the principles of an embodiment, this objective is achieved by an evaporative emission control system for a vehicle. The system includes a fuel tank, a vapor collection canister in communication with the fuel tank so as to receive hydrocarbons, a fuel cell in communication with the canister, and a pump constructed and arranged to pump hydrocarbons from the canister to the fuel cell so that the fuel cell can purge the canister by converting the hydrocarbons to water, carbon dioxide and electricity.

In accordance with another aspect of an embodiment, a plug-in hybrid vehicle includes an electric motor providing a primary driving force for the vehicle, a battery pack for supplying electricity to operate the motor, an internal combustion engine for providing power to the vehicle when the battery pack is not capable of supplying electricity to operate motor, a fuel tank for supplying fuel to the engine, a vapor collection canister in communication with the fuel tank so as to receive hydrocarbons, a fuel cell in communication with the canister, and a pump constructed and arranged to pump hydrocarbons from the canister to the fuel cell so that the fuel cell can purge the canister by converting the hydrocarbons to water, carbon dioxide and electricity even when the engine is not operating.

In accordance with yet another aspect of an embodiment, a method of purging hydrocarbons from an evaporative emission control system of a vehicle provides an evaporative control system including a fuel tank, a vapor collection canister in communication with the fuel tank, and a fuel cell in communication with the canister. Hydrocarbons are sent from the canister to the fuel cell so that the fuel cell can purge the canister by converting the hydrocarbons to water, carbon dioxide and electricity.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, in which.

DETAILED DESCRIPTION OF AN EXEMPLARY EMBODIMENT

Figure 1:
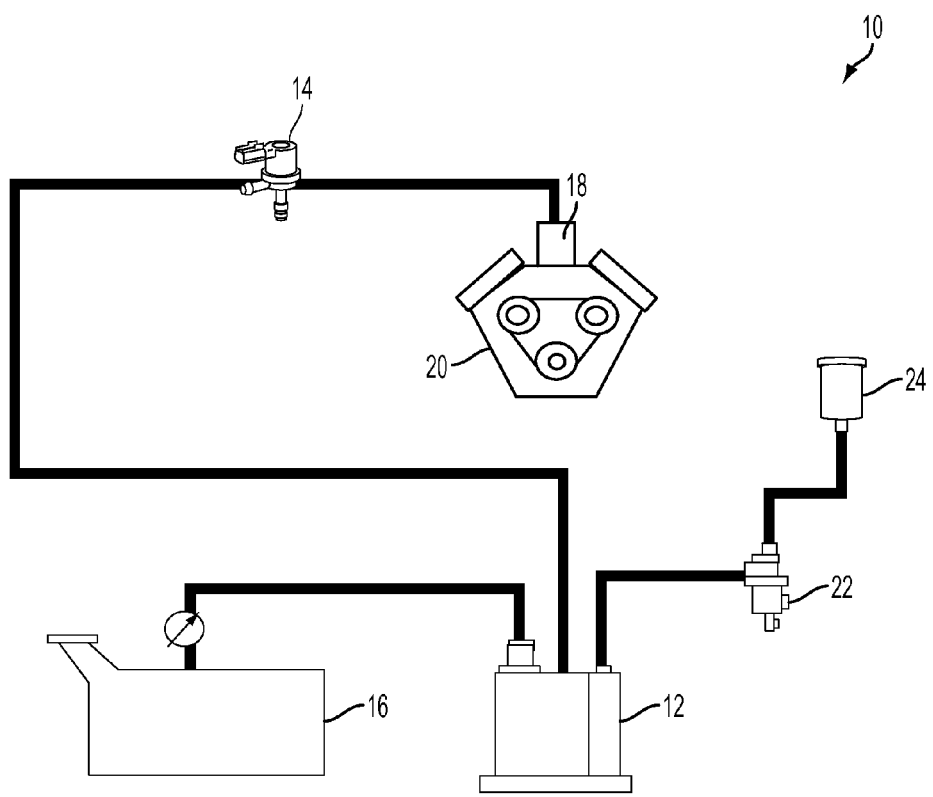
FIG. 1 is a schematic illustration showing a conventional evaporative emission control system.
Figure 2:
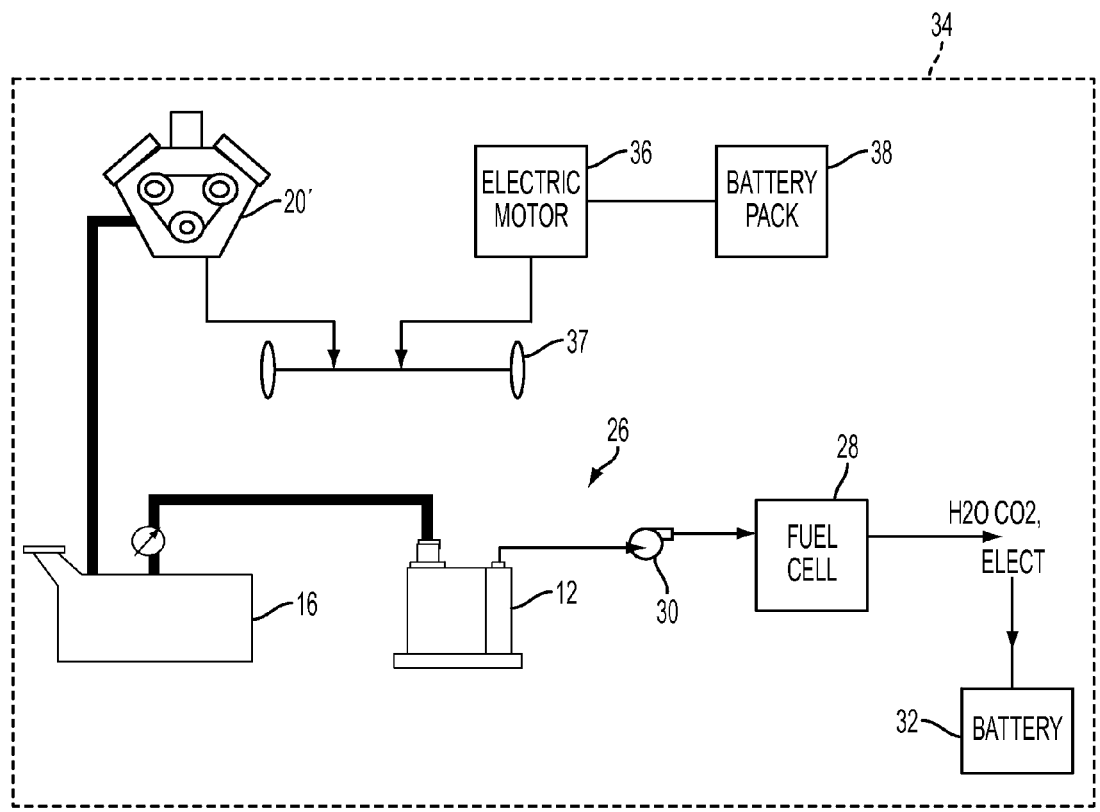
FIG. 2 is a schematic view of a plug-in hybrid vehicle having an evaporative emission control system that permits cleaning of the canister using a fuel cell.

Referring to FIG. 2, an evaporative emission control system for a vehicle is shown, generally indicated at 26, in accordance with an embodiment. The system 26 comprises a fuel tank 16, a charcoal vapor collection canister 12 in communication with the tank 16, a fuel cell 28 in communication with the canister 12, and a pump 30 constructed and arranged to pump hydrocarbons from the canister 12 to the fuel cell 28 so that the fuel cell 28 can purge the canister 12 by converting the hydrocarbons to water, carbon dioxide and electricity.

In the embodiment, the fuel cell 28 is preferably a solid state oxide fuel cell for oxidizing hydrocarbons to produce electricity preferably in the range of about 13-48V. The electricity generated by the fuel cell 28 is received by a battery 32 for storing electrical energy.

The vehicle, generally indicated at 34, is preferably a plug-in hybrid vehicle having an electric motor 36 for providing the primary force for driving the wheels 37 of the vehicle 34. A battery pack 38, charged by being plugged into an electrical outlet, provides electricity to operate the motor 36. As used herein, "battery pack" can include one or more batteries. The electric motor 36 drives the wheels 37 until the batteries of the battery pack 38 are drained. Once the batteries are drained, an internal combustion engine 20, supplied with fuel from the fuel tank 16, is employed to provide the power to drive the wheels 37 in the conventional manner and to charge the battery pack 38.

Thus, the system 26 allows cleaning or purging of the canister 12, in compliance with EVAP emission regulations, without operating the engine 20'. This maximizes fuel economy as more battery charging occurs in the plug-in mode, reduces exhaust emissions caused by engine cycles for cleaning the canister 12 since only the fuel recovered from the canister is oxidized, and converts hydrocarbons directly to electricity, which is the primary energy form on the vehicle 34. Also, the efficiency of the engine 20' and alternator do not reduce the energy stored in the battery 32. The system 26 also reduces the vehicle calibration complexity and engineering cost since the system 26 will work independently of the engine 20'.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. An evaporative emission control system for a vehicle comprising:
   a fuel tank,
   a vapor collection canister in communication with the fuel tank so as to receive hydrocarbons,
   a fuel cell in communication with the canister, and
   a pump constructed and arranged to pump hydrocarbons from the canister to the fuel cell so that the fuel cell can purge the canister by converting the hydrocarbons to water, carbon dioxide and electricity,
   wherein the evaporative emission control system is in combination with an internal combustion engine, the fuel tank supplying fuel to the engine, wherein the fuel cell and pump are constructed and arranged to purge the canister without operating the engine.

2. The system of claim 1, further comprising a battery associated with the fuel cell so that the electricity generated by the fuel cell is stored by the battery.

3. The system of claim 2, wherein the fuel cell is constructed and arranged to generate electricity in the range of about 13-48 volts.

4. The system of claim 1, in further combination with the vehicle, the vehicle being a plug-in hybrid vehicle.

5. A plug-in hybrid vehicle comprising:
   an electric motor providing a primary driving force for the vehicle,
   a battery pack for supplying electricity to operate the motor,
   an internal combustion engine for providing power to the vehicle when the battery pack is not capable of supplying electricity to operate motor,
   a fuel tank for supplying fuel to the engine,
   a vapor collection canister in communication with the fuel tank so as to receive hydrocarbons,
   a fuel cell in communication with the canister, and
   a pump constructed and arranged to pump hydrocarbons from the canister to the fuel cell so that the fuel cell can purge the canister by converting the hydrocarbons to water, carbon dioxide and electricity even when the engine is not operating.

6. The vehicle of claim 5, further comprising a battery associated with the fuel cell so that the electricity generated by the fuel cell is stored in the battery.

7. The vehicle of claim 6, wherein the fuel cell is constructed and arranged to generate electricity in the range of about 13-48 volts.

8. A method of purging hydrocarbons from an evaporative emission control system of a vehicle, the method comprising the steps of:
   providing an evaporative control system including a fuel tank, a vapor collection canister in communication with the fuel tank, and a fuel cell in communication with the canister, and
   sending hydrocarbons from the canister to the fuel cell so that the fuel cell can purge the canister by converting the hydrocarbons to water, carbon dioxide and electricity,
   wherein the vehicle is a plug-in hybrid vehicle having an electric motor providing a primary driving force for the vehicle, a battery pack for supplying electricity to operate the motor, and an internal combustion engine for providing power to the vehicle when the battery pack is not capable of supplying electricity to operate the motor, wherein the sending step occurs when the engine is not in operation.

9. The method of claim 8, further comprising storing the electricity in a battery.

* * * * *